Patented Aug. 7, 1945

2,380,926

UNITED STATES PATENT OFFICE 2,380,926

PLASTIC COMPOSITION

La Verne E. Cheyney, Akron, Ohio, assignor to Wingfoot Corporation, Akron, Ohio, a corporation of Delaware No Drawing. Application October 21, 1942, Serial No. 462,820

5 Claims. (Cl. 260—36)

This invention relates to the use of plasticizers in plastic compositions composed essentially of a polyvinyl acetal. More particularly, it relates to the use of monohydric aliphatic alcohols as plasticizers in such compositions.

The polyvinyl acetals are made by the condensation of an aldehyde, such as formaldehyde, acetaldehyde, propionaldehyde, butyraldehyde, benzaldehyde, etc., with a partially hydrolyzed polyvinyl ester, such as an acetate or butyrate or propionate, etc. The most common acetal is that produced from butyraldehyde; it is known as polyvinyl butyral.

The alcohols used in the compositions of this invention are unsaturated and contain between about twelve and about twenty carbon atoms. They may be straight-chain or branched-chain alcohols. They may be used alone or together with other plasticizers or other compounding ingredients. The amount employed may vary from 5 per cent up to the compatible limit for the particular system which may be 50 per cent or more.

The effect of the plasticizer is illustrated by the following table which gives the effect of various alcohols on the properties of polyvinyl butyral films of 0.002 inch thickness. In the first column the amount of the alcohol is given. There are two controls. The first control contains no plasticizer, and the second control, which contains dibutyl sebacate, is listed to compare its properties with the properties of a film which contains an alcohol in addition to dibutyl sebacate.

*Stress-strain properties of plasticized films*

| Plasticizer (parts: 100 resin) | Load at— | | Ultimate | |
|---|---|---|---|---|
| | 20% elong., kg./cm.² | 100% elong., kg./cm.² | Tensile strength, kg./cm.² | Elongation, percent |
| None (control film) | 370 | | 370 | 32 |
| 20 Oleyl alcohol | 2 | 9 | 118 | 240 |
| 10 dibutyl sebacate (control film) | 147 | 166 | 238 | 200 |
| 10 dibutyl sebacate+10 stearyl alcohol | 18 | 31 | 137 | 170 |

Other unsaturated alcohols than those mentioned in the table may be used, as for example, linaloöl, phytol, geraniol, nerol, etc.

It is evident from the table that the plasticizer decreases the load required to produce any given elongation of the film. It also decreases the ultimate tensile strength, but increases the ultimate elongation of the film. Other changes in the films were noted, such as increased flexibility, resistance to cutting and tearing, etc.

The degree of compatibility of any given alcohol with a given polyvinyl acetal will be a function of both the structure of the alcohol and that of the resin, inasmuch as the resin may contain varying numbers of residual ester and hydroxyl groups as well as the indicated variation in the aldehyde employed in its preparation. In certain instances, it may be desirable to use another plasticizer or other compounding ingredient to render the alcohol more compatible with the plastic composition.

These plasticizers may be employed in the formulation not only of cast films but of other plastic compositions where flexibility, softness, resistance to tear, resilience, impact strength, etc., are desirable. Such compositions might advantageously be coatings applied to sheet materials, such as cloth or paper, extruded products or molding compositions.

Films of the thickness indicated may be employed for the fabrication of packages or for fashioning garments, such as raincoats, or other products, such as shower curtains, umbrellas, etc. Coated fabrics or paper in which the coating composition contains a polyvinyl acetal resin plasticized with one of the alcohols of this invention are especially useful for the fabrication of water-proof materials, which may be used for some of the same uses as those indicated for the films and which possess additional strength because of the backing to which the coating is applied. Extruded products may take the form of flexible tubing or of calendered sheet material which is an extremely valuable safety-glass interlayer because of its excellent low temperature properties. Molded products of the compositions indicated by this invention are useful substitutes for rubber goods because of their resilience and elasticity.

What I claim is:

1. A polyvinyl butyral composition which is plasticized with oleyl alcohol.

2. A polyvinyl acetal composition which is plasticized with an alcohol from the group consisting of oleyl alcohol and phytol.

3. A polyvinyl butyral composition which is plasticized with phytol alcohol.

4. A polyvinyl butyral film plasticized with an alcohol selected from the group consisting of oleyl and phytol.

5. A sheet material coated with a polyvinyl butyral composition which is plasticized with an alcohol selected from the group consisting of oleyl and phytol.

LA VERNE E. CHEYNEY.